(12) United States Patent
Hu

(10) Patent No.: US 9,680,817 B2
(45) Date of Patent: Jun. 13, 2017

(54) INFORMATION DISPLAY METHOD, TERMINAL, SECURITY SERVER AND SYSTEM

(71) Applicant: TENCENT TECHNOLOGY (SHENZHEN) COMPANY LIMITED, Shenzhen (CN)

(72) Inventor: Shuai Hu, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 14/652,786

(22) PCT Filed: Jan. 14, 2014

(86) PCT No.: PCT/CN2014/070586
§ 371 (c)(1),
(2) Date: Jun. 16, 2015

(87) PCT Pub. No.: WO2014/111006
PCT Pub. Date: Jul. 24, 2014

(65) Prior Publication Data
US 2015/0341339 A1     Nov. 26, 2015

(30) Foreign Application Priority Data

Jan. 16, 2013 (CN) .......................... 2013 1 0016384

(51) Int. Cl.
*H04L 29/06*      (2006.01)

(52) U.S. Cl.
CPC ...... *H04L 63/0807* (2013.01); *H04L 63/0861* (2013.01); *H04L 63/0876* (2013.01); *H04L 63/1483* (2013.01)

(58) Field of Classification Search
CPC ...... G06T 11/20; G06T 2210/32; H04M 1/00; H04M 1/66; H04M 2250/04;
(Continued)

(56) References Cited

U.S. PATENT DOCUMENTS

| 8,831,677 B2* | 9/2014 | Villa-Real | H04M 1/66 455/552.1 |
| 2004/0030926 A1* | 2/2004 | Clark | H04L 63/0428 726/1 |
| 2013/0100137 A1* | 4/2013 | Chang | G06K 9/00476 345/441 |

FOREIGN PATENT DOCUMENTS

| CN | 102663589 A | 9/2012 |
| CN | 102789463 A | 11/2012 |
| WO | WO 2011-102805 A1 | 8/2011 |

OTHER PUBLICATIONS

International Search Report (ISR) for PCT/CN2014/070586 dated Apr. 9, 2014 by State Intellectual Property Office of the P.R. China (ISA/CN).

(Continued)

*Primary Examiner* — Thanhnga B Truong
(74) *Attorney, Agent, or Firm* — Dilworth & Barrese, LLP; Michael J. Musella, Esq.

(57) ABSTRACT

Disclosed is an information display method, a terminal, a security server and a system, which belong to the field of computers. The method comprises: parsing received information which includes corresponding two-dimensional (2D) code carrying content data, the content data containing anti-fake information; acquiring the content data carried in the 2D code, and detecting whether the information is transmitted by a security server according to the anti-fake information contained in the content data; and acquiring content to be displayed corresponding to the information from the security server and displaying the content to be (Continued)

displayed if the information is detected as being transmitted by the security server.

6 Claims, 12 Drawing Sheets

(58) Field of Classification Search
CPC .......... H04M 2250/14; G06K 9/00476; G06K 9/00013; G08B 7/068; G07C 9/00087; H04W 12/06; G07F 7/0886; G06Q 20/32; G06Q 20/363; G06Q 20/3227; G06Q 20/4014; H04L 63/0861; H04L 63/083; H04L 63/0428; H04L 63/18; H04L 63/164; H04L 63/08
USPC ...................... 713/172; 726/1; 709/227, 238; 345/441; 455/552.1
See application file for complete search history.

(56) References Cited

OTHER PUBLICATIONS

Chinese Office Action mailed Aug. 18, 2016.

\* cited by examiner

US 9,680,817 B2

INFORMATION DISPLAY METHOD, TERMINAL, SECURITY SERVER AND SYSTEM

CROSS-REFERENCE TO RELATED APPLICATION

This application is the National Stage of International Application No. PCT/CN2014/070586 filed Jan. 14, 2014, which claims priority from Chinese Patent Application No. 201310016384.1, filed on Jan. 16, 2013 to the State Intellectual Property Office of the P.R.C, the entire contents of which are incorporated herein by reference.

FIELD OF THE INVENTION

The present disclosure relates to the field of computer, and particularly, to an information display method, a terminal, a security server and a system.

BACKGROUND OF THE INVENTION

With the rapid development of various network applications, the user's requirement of the network information security is increasingly high. In order to prevent the user from being troubled by the danger information (e.g., phishing email), a safer information display method is required to display the important information.

The relevant information display method for displaying the important information is to make a special identification to the important information, so that the user confirms that the information is secure when seeing the identification with his naked eyes. For example, a network application operator adds a special identification (e.g., the operator's logo) to the important information (e.g., a password change email, an e-bank payment webpage, etc.) transmitted to the user, and the user confirms that the information is secure information transmitted by the operator when seeing the special identification.

During the process of implementing the embodiments of the present disclosure, the inventor finds that the related art at least has the following problem.

The way of recognizing the special identification added into the information mainly depends on the user's visual inspection, while the special identification can be easily imitated, thus it is difficult for the user to recognize whether the information is secure, and the security is not high.

SUMMARY OF THE INVENTION

In order to solve the problem in the related art that it is very difficult for a user to accurately recognize whether the information is secure, the embodiments of the present disclosure provide an information display method, a terminal, a security server and a system. The technical solutions are described as follows.

In one aspect, an information display method used in a terminal is provided, comprising:
parsing received information which includes corresponding two-dimensional (2D) code carrying content data, the content data containing anti-fake information;
acquiring the content data carried in the 2D code, and detecting whether the information is transmitted by a security server according to the anti-fake information contained in the content data; and
acquiring content to be displayed corresponding to the information from the security server and displaying the content to be displayed if the information is detected as being transmitted by the security server.

In another aspect, an information display method used in a security server is provided, comprising:
generating anti-fake information, adding the anti-fake information into content data, and generating a 2D code according to the content data;
generating information according to the 2D code;
transmitting the information to a terminal, so that the terminal detects whether the information is transmitted by the security server according to the anti-fake information;
generating a content to be displayed;
after the terminal detects that the information is transmitted by the security server according to the anti-fake information, transmitting the generated content to be displayed to the terminal, so that the terminal displays the content to be displayed.

In another aspect, a terminal is provided, comprising:
a parsing module configured to parse received information which includes corresponding 2D code carrying content data, the content data containing anti-fake information;
a data acquiring module configured to acquire the content data carried in the 2D code parsed by the parsing module;
a first detecting module configured to detect whether the information is transmitted by a security server according to the anti-fake information contained in the content data acquired by the data acquiring module;
an information acquiring module configured to acquire a content to be displayed corresponding to the information from the security server if the first detecting module detects that the information is transmitted by the security server; and
a display module configured to display the content to be displayed acquired by the information acquiring module.

In another aspect, a security server is provided, comprising:
an anti-fake information generating module configured to generate anti-fake information;
a first adding module configured to add the anti-fake information generated by the anti-fake information generating module into content data;
a 2D code generating module configured to generate a 2D code according to the content data with the anti-fake information added by the first adding module;
an information generating module configured to generate information according to the 2D code generated by the 2D code generating module;
an information transmitting module configured to transmit the information generated by the information generating module to a terminal, so that the terminal detects whether the information is transmitted by the security server according to the anti-fake information;
a content to be displayed generating module configured to generate a content to be displayed; and
a content to be displayed transmitting module configured to transmit the content to be displayed generated by the content to be displayed generating module to the terminal when the terminal detects that the information is transmitted by the security server according to the anti-fake information, so that the terminal displays the content to be displayed.

In another aspect, a terminal is provided, comprising:
one or more processors; and
a memory;
the memory stores one or more programs configured to be executed by the one or more processors and containing instructions for performing operations of:

parsing received information which includes corresponding two-dimensional (2D) code carrying content data, the content data containing anti-fake information;

acquiring the content data carried in the 2D code, and detecting whether the information is transmitted by a security server according to the anti-fake information contained in the content data; and acquiring content to be displayed corresponding to the information from the security server and displaying the content to be displayed if the information is detected as being transmitted by the security server.

In another aspect, a security server is provided, comprising:

one or more processors; and a memory;

the memory stores one or more programs configured to be executed by the one or more processors and containing instructions for performing operations of:

generating anti-fake information, adding the anti-fake information into content data, and generating a 2D code according to the content data;

generating information according to the 2D code;

transmitting the information to a terminal, so that the terminal detects whether the information is transmitted by the security server according to the anti-fake information;

generating a content to be displayed;

after the terminal detects that the information is transmitted by the security server according to the anti-fake information, transmitting the generated content to be displayed to the terminal, so that the terminal displays the content to be displayed.

In another aspect, an information display system is provided, comprising the above terminal and security server.

The technical solutions provided by the embodiments of the present disclosure bring the following beneficial effects:

The present disclosure acquires the anti-fake information carried in the 2D code by parsing the received information which includes the 2D code, detects whether the information is transmitted by the security server according to the anti-fake information, and displays the content to be displayed of the information if the information is transmitted by the security server, thereby solving the problem in the related art that it is difficult for the user to accurately recognize whether the information is secure, and achieves the purpose of automatically recognizing whether the received information is secure by the terminal according to the information containing the 2D code, and improving the information security.

BRIEF DESCRIPTION OF THE DRAWINGS

In order to more clearly describe the technical solutions in the embodiments of the present disclosure, the drawings to be used in the descriptions of the embodiments will be briefly introduced as follows. Obviously, the following drawings just illustrate some embodiments of the present disclosure, and a person skilled in the art can obtain other drawings from these drawings without paying any creative effort.

DETAILED DESCRIPTION OF THE PREFERRED EMBODIMENTS

In order that the object, technical solutions and advantages of the present disclosure are clearer, the embodiments of the present disclosure will be further described in details in conjunction with the drawings.

Figure 1:
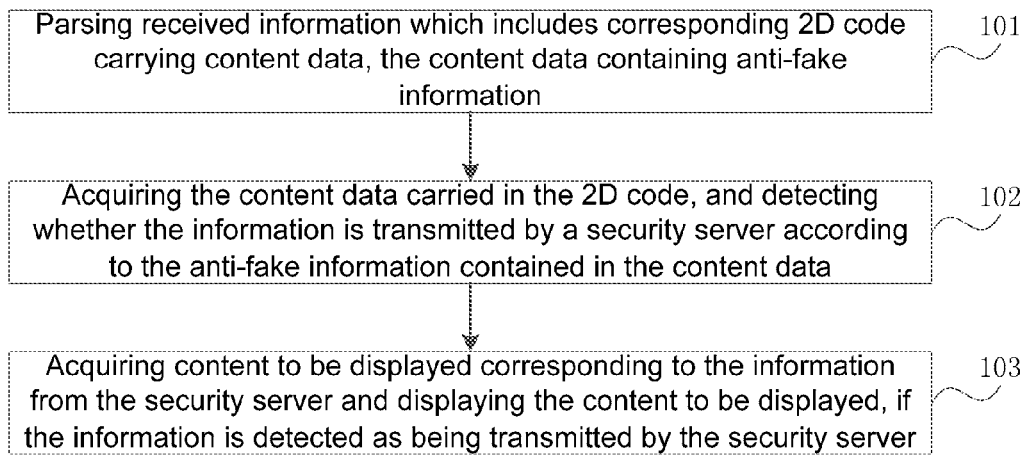
FIG. 1 is a methodological flowchart of an information display method provided by an embodiment of the present disclosure.

Please referring to FIG. 1, a methodological flowchart of an information display method provided by an embodiment of the present disclosure is illustrated. The information display method is applicable to a terminal, and includes the following steps:

Step 101: parsing received information which includes corresponding 2D code carrying content data, the content data containing anti-fake information;

Step 102: acquiring the content data carried in the 2D code, and detecting whether the information is transmitted by a security server according to the anti-fake information contained in the content data; and Step 103: acquiring content to be displayed corresponding to the information from the security server and displaying the content to be displayed, if the information is detected as being transmitted by the security server.

If the information is detected as being transmitted by the security server, a request for acquiring the content to be displayed may be transmitted to the security server, so that the security server transmits the content to be displayed according to the request.

The information in the embodiment of the present disclosure may be email, webpage information or notification information etc, and the security server is the official server which transmits the information.

To sum up, the information display method provided by the embodiment of the present disclosure acquires the anti-fake information carried in the 2D code by parsing the received information which includes the 2D code, detects whether the information is transmitted by the security server according to the anti-fake information, and acquires the content to be displayed of the information from the security server and displays the content to be displayed if the information is transmitted by the security server. Thus the above method solves the problem in the related art that it is difficult for the user to accurately recognize whether the information is secure, and achieves the purpose of automatically recognizing whether the received information is secure by the terminal according to the information containing the 2D code, and improving the information security.

Figure 2:
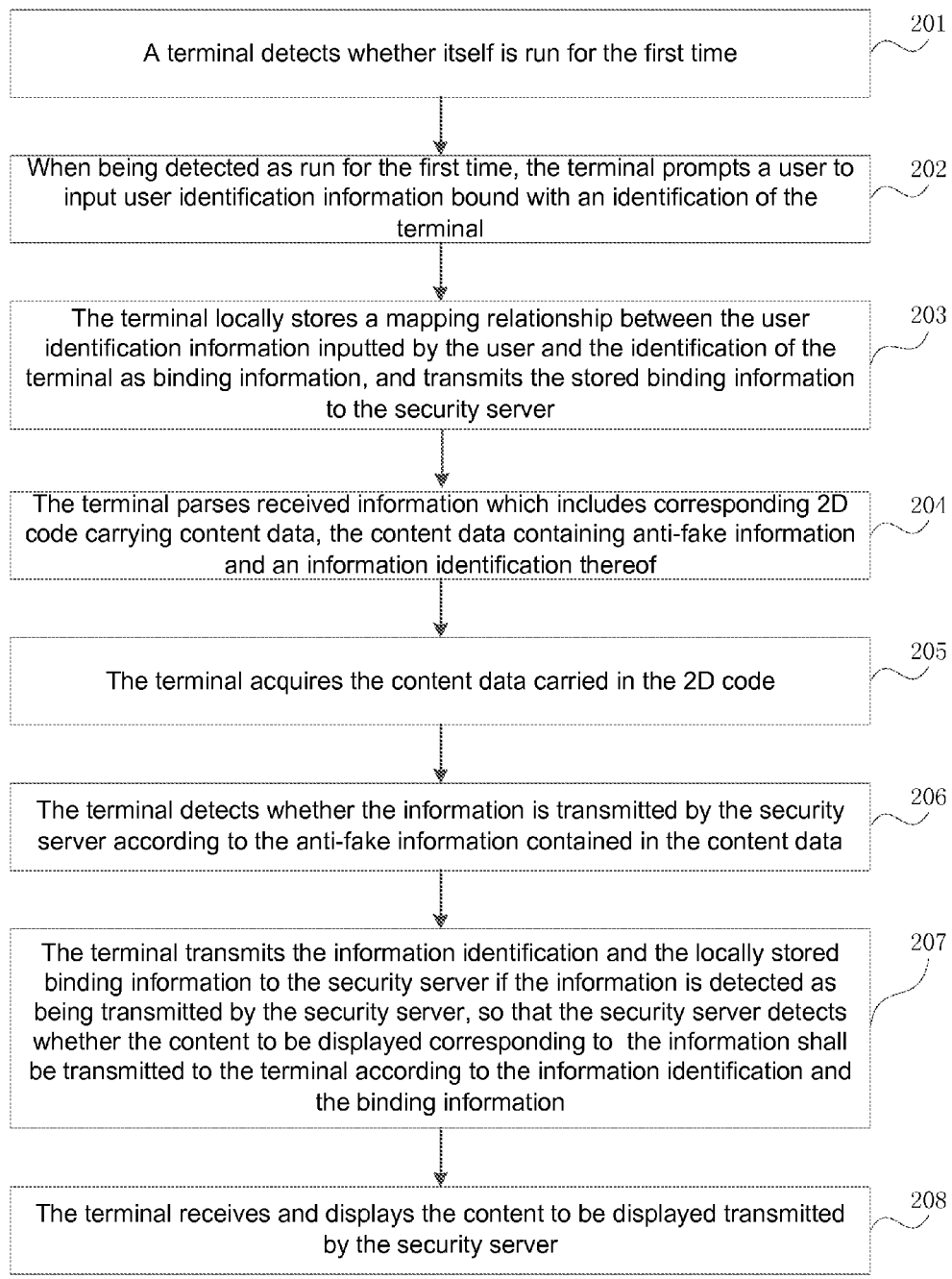
FIG. 2 is a methodological flowchart of an information display method provided by another embodiment of the present disclosure.

Please referring to FIG. 2, a methodological flowchart of an information display method provided by another embodiment of the present disclosure is illustrated. The information display method is applicable to a terminal, and includes the following steps:

Step 201: a terminal detects whether itself is run for the first time.

the terminal may be a mobile terminal (e.g., cell phone or tablet computer) or a fixed terminal (e.g., desktop computer) where a plugin or an application (APP, third party application) downloaded from a security server is installed.

Step 202: when being detected as run for the first time, the terminal prompts a user to input user identification information bound with an identification of the terminal.

Each terminal is corresponding to a unique identification, such as an identity (ID, serial number) of the plugin or the APP downloaded from the security server and installed in the terminal. When the plugin or the APP downloaded from the security server and installed in the terminal is run for the first time, a piece of unique user identification information shall be bound. The user identification information is manually inputted by the user, and it may include one or more of a user name, a user account, an email address and a user serial number.

Step 203: the terminal locally stores the mapping relationship between the user identification information inputted by the user and the identification of the terminal as binding information, and transmits the stored binding information to the security server.

The user identification information of one user can only be bound with the identification of one terminal in one time.

Step 204: the terminal parses received information which includes corresponding 2D code carrying content data, the content data containing anti-fake information and an information identification thereof;

When receiving a piece of information, the terminal parses the 2D code contained in the information, the content data of the 2D code containing the anti-fake information and information identification of the information.

The anti-fake information carried in the 2D code may be a security code character string, while the information identification thereof is used to identify the information and it may be a unique number of the information and/or a serial number of the 2D code contained in the information.

Step 205: the terminal acquires the content data carried in the 2D code.

Specifically, the content data carried in the 2D code may be encrypted content data. The terminal scans the 2D code carried in the information to acquire the encrypted content data, and decrypts the encrypted content data in a predetermined decryption algorithm to acquire decrypted content data.

Step 206: the terminal detects whether the information is transmitted by the security server according to the anti-fake information contained in the content data.

The terminal may detect whether the information is transmitted by the security server according to the anti-fake information in the decrypted content data.

If yes, the information is secure, and the terminal enters step 207, otherwise the terminal does not display the content to be displayed of the information, or it prompts the user that the information is unsecure.

Step 207: the terminal transmits the information identification and the locally stored binding information to the security server if the information is detected as being transmitted by the security server, so that the security server detects whether the content to be displayed corresponding to the information shall be transmitted to the terminal according to the information identification and the binding information.

Specifically, when the terminal detects that the information is transmitted by the security server according to the anti-fake information contained in the content data, the information identification carried in the content data of the 2D code and the locally stored binding information may be carried in a request for acquiring the content to be displayed, and the request for acquiring the content to be displayed is transmitted to the security server. After receiving the information identification and the binding information carried in the request, the security server inquires the binding information transmitted to the security server during the first usage of the terminal according to the information identification, compares the received binding information with the inquired binding information, and detects that the content to be displayed of the information may be transmitted to the terminal if the two compared information is consistent with each other. In that case, the security server transmits the content to be displayed of the information to the terminal.

Step 208: the terminal receives and displays the content to be displayed transmitted by the security server.

The information may further include a brief introduction content thereof, such as the subject of the content to be displayed of the information, and relevant description of the 2D code contained in the information. After parsing the received information, the terminal may firstly display the 2D code and the brief introduction content carried in the information to the user.

Specifically, the terminal may firstly display the 2D code and the brief introduction content carried in the information to the user as a first state of the information. When receiving the content to be displayed of the information transmitted by the security server, the terminal updates the state of the information into a second state in the display page, i.e., displays all information contents including the content to be displayed of the information, or the terminal may also individually display the received content to be displayed in other interface or area.

In the practical applications, a twin number (i.e., the user's account and password are leaked) may appear. For example, when the user's mailbox password is leaked and acquired by a thief, the security server will send an email containing important content to the user's mailbox. In the related art, both the user and the thief can view the important content in the email, and the email security cannot be ensured. But in the above information display method, the important content in the email is taken as the content to be displayed and not transmitted temporarily, and when the information is detected as being transmitted by the security server according to the anti-fake information in the 2D code, the terminal transmits the information identification of the information and the locally stored binding information to the security server, so that the security server detects whether the content to be displayed of the information shall be transmitted to the terminal according to the information identification and the binding information. If yes, it means that the terminal is bound with the user identification information of the user, and the security server transmits the important content to the terminal. If not, it means that the terminal is not bound with the user identification information of the user, and the security server does not transmit the important content to the terminal, thereby improving the information (email) security.

To sum up, in the information display method provided by the embodiment of the present disclosure, the terminal acquires the anti-fake information carried in the 2D code by parsing the received information which includes the 2D code, and detects whether the information is transmitted by the security server according to the anti-fake information, thereby solving the problem in the related art that it is difficult for the user to accurately recognize whether the information is secure, and achieving the purpose of automatically recognizing whether the received information is secure by the terminal according to the information containing the 2D code and improving the information security.

In addition, the information display method provided by the embodiment of the present disclosure transmits the information identification in the 2D code carried in the information and the binding information locally stored by the terminal to the security server, if the information is detected as being transmitted by the security server, so that the security server detects whether the content to be displayed of the information shall be transmitted to the terminal according to the information identification and the binding information; and displays the content to be displayed of the information transmitted by the security server after receiving the same, thereby solving the problem in the related art that the content to be displayed of the information cannot be prevented from being viewed by other persons when a twin number appears, and achieving the purpose of improving the information security.

Figure 3:
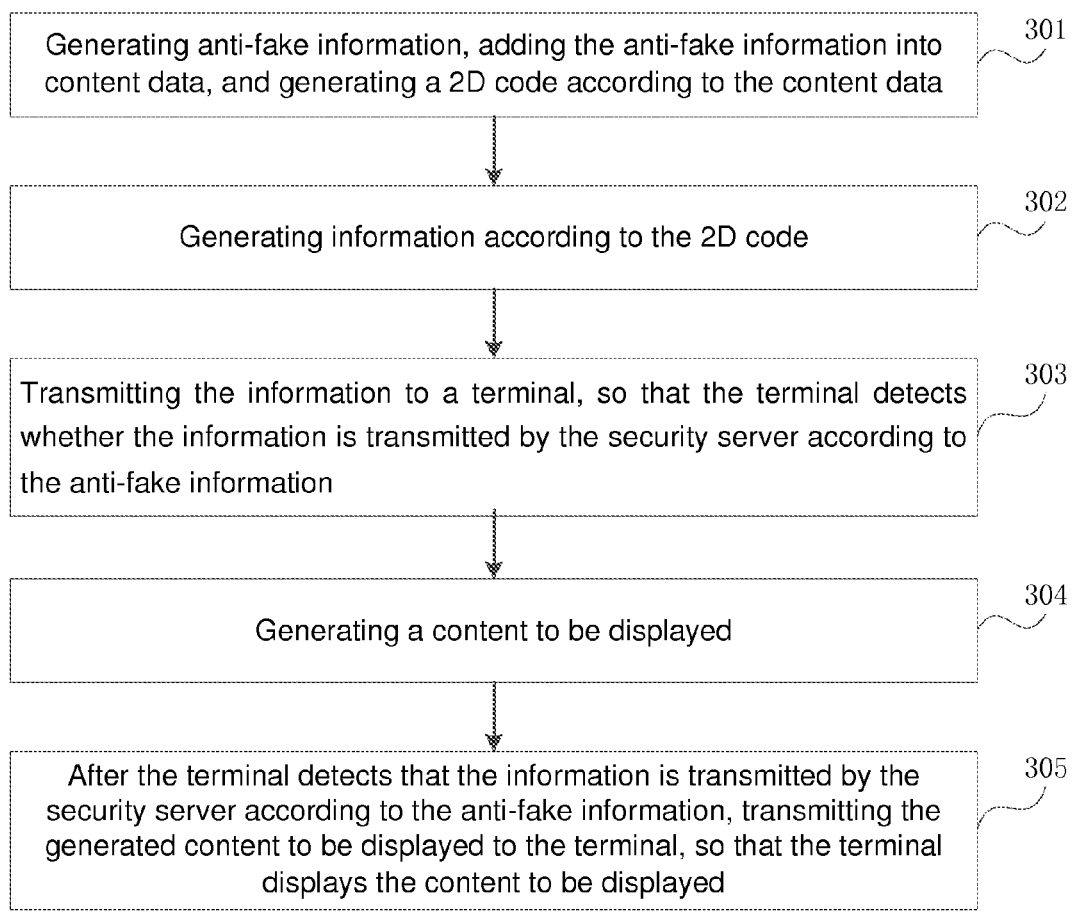
FIG. 3 is a methodological flowchart of an information display method provided by still another embodiment of the present disclosure.

Please referring to FIG. 3, a methodological flowchart of an information display method provided by still another embodiment of the present disclosure is illustrated. The information display method is applicable to a security server, and includes the following steps:

Step 301: generating anti-fake information, adding the anti-fake information into content data, and generating a 2D code according to the content data;

Step 302: generating information according to the 2D code;

Step 303: transmitting the information to a terminal, so that the terminal detects whether the information is transmitted by the security server according to the anti-fake information;

Step 304: generating a content to be displayed;

Step 305: after the terminal detects that the information is transmitted by the security server according to the anti-fake information, transmitting the generated content to be displayed to the terminal, so that the terminal displays the content to be displayed.

Specifically, after detecting that the information is transmitted by the security server according to the anti-fake information, the terminal may transmit a request for acquiring the content to be displayed to the security server. After receiving the request, the security server transmits the generated content to be displayed to the terminal.

To sum up, the information display method provided by the embodiment of the present disclosure generates the information according to the 2D code added with the anti-fake information, and transmits the information to the terminal, so that the terminal detects whether the information is transmitted by the security server according to the anti-fake information, thereby solving the problem in the related art that it is difficult for the user to accurately recognize whether the information is secure, and achieving the purpose of automatically recognizing whether the received information is secure by the terminal according to the information containing 2D code, and improving the information security.

Figure 4:
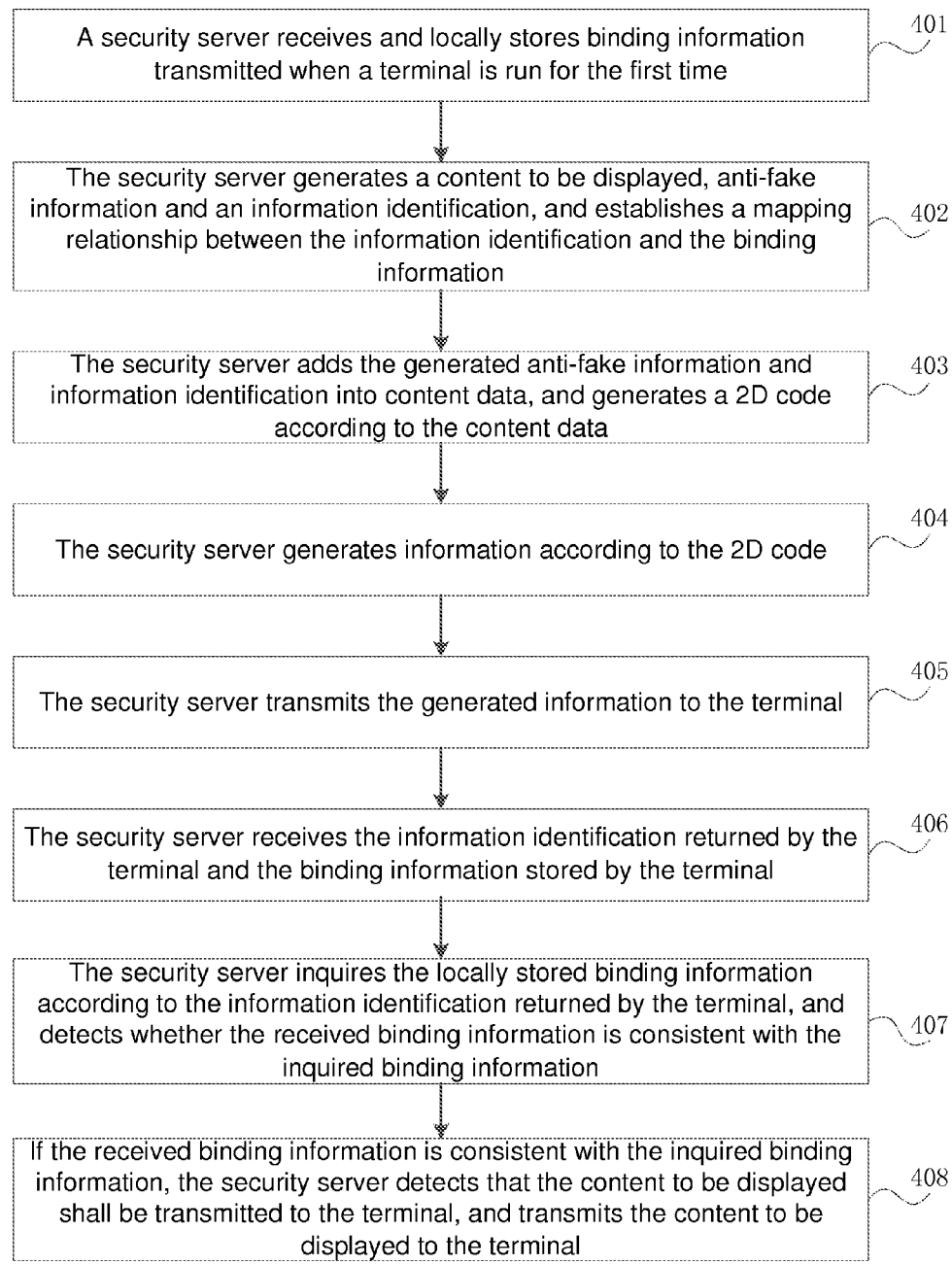
FIG. 4 is a methodological flowchart of an information display method provided by yet another embodiment of the present disclosure.

Please referring to FIG. 4, a methodological flowchart of an information display method provided by yet another embodiment of the present disclosure is illustrated. The information display method is applicable to a security server, and includes the following steps:

Step 401: the security server receives and locally stores binding information transmitted when a terminal is run for the first time.

The binding information transmitted when the terminal is run for the first time is inputted by the user when the terminal is run for the first time to bind a mapping relationship between the user identification information of the terminal and an identification of the terminal. The security server receives and locally stores binding information.

Step 402: the security server generates a content to be displayed, anti-fake information and an information identification, and establishes a mapping relationship between the information identification and the binding information.

The content to be displayed may be the text of an email to be transmitted and an attachment carried in the email etc. The anti-fake information may be a security code character string, while the information identification may be a unique number of the information to be transmitted and/or a serial number of the 2D code to be contained in the information.

The security server may search the locally stored binding information of the terminal according to the user identification information corresponding to the information to be transmitted, and establishes the mapping relationship between the information identification and the binding information.

For example, when an email is to be transmitted, the information identification is a unique code of the email, and the user information identification is the user's email address. The security server inquires the email address of the destination user of the email according to the unique code of the email, then locally inquires the binding information transmitted by the terminal bound with the email address according to the inquired email address, and finally establishes the mapping relationship between the unique code of the email and the inquired binding information.

In addition, the security server also stores information identification corresponding to the generated content to be displayed.

Step 403: the security server adds the generated anti-fake information and information identification into content data, and generates a 2D code according to the content data.

Specifically, the security server may encrypt the content data in an encryption algorithm to acquire encrypted content data, and generates the 2D code according to the encrypted content data.

Step 404: the security server generates the information according to the 2D code.

The security server may take the 2D code as information to be transmitted. In addition, the security server may add brief introduction content corresponding to the information into the information, such as the subject of content to be displayed corresponding to the information, and relevant description of the 2D code contained in the information.

Step 405: the security server transmits the generated information to the terminal.

To be noted, the security server firstly transmits the information containing the 2D code to the terminal, while the content to be displayed stored In correspondence to the information identification of the information is not transmitted temporarily.

Step 406: the security server receives the information identification returned by the terminal and the binding information stored by the terminal.

Specifically, after receiving the information, the terminal firstly detects whether the information is transmitted by the security server according to the anti-fake information in the 2D code contained in the information. If yes, the terminal may transmit the information identification in the 2D code contained in the information and the binding information stored by the terminal together to the security server.

Step 407: the security server inquires the locally stored binding information according to the information identification returned by the terminal, and detects whether the received binding information is consistent with the inquired binding information.

If the received binding information is consistent with the locally inquired binding information, the security server confirms that the information is received by a correct terminal, and the content to be displayed corresponding to the information may be transmitted to the terminal.

Step 408: if the received binding information is consistent with the locally inquired binding information, the security server detects that the content to be displayed shall be transmitted to the terminal, and transmits the content to be displayed to the terminal.

When it is detected in step 407 that the received binding information is consistent with the inquired binding information, the security server performs a step of transmitting the content to be displayed to the terminal, so that the terminal displays the content to be displayed of the information to the user.

In the information display method provided by the embodiment of the present disclosure, the security server ensures the information security when transmitting important information such as an email or a notification to the user.

Figure 5:
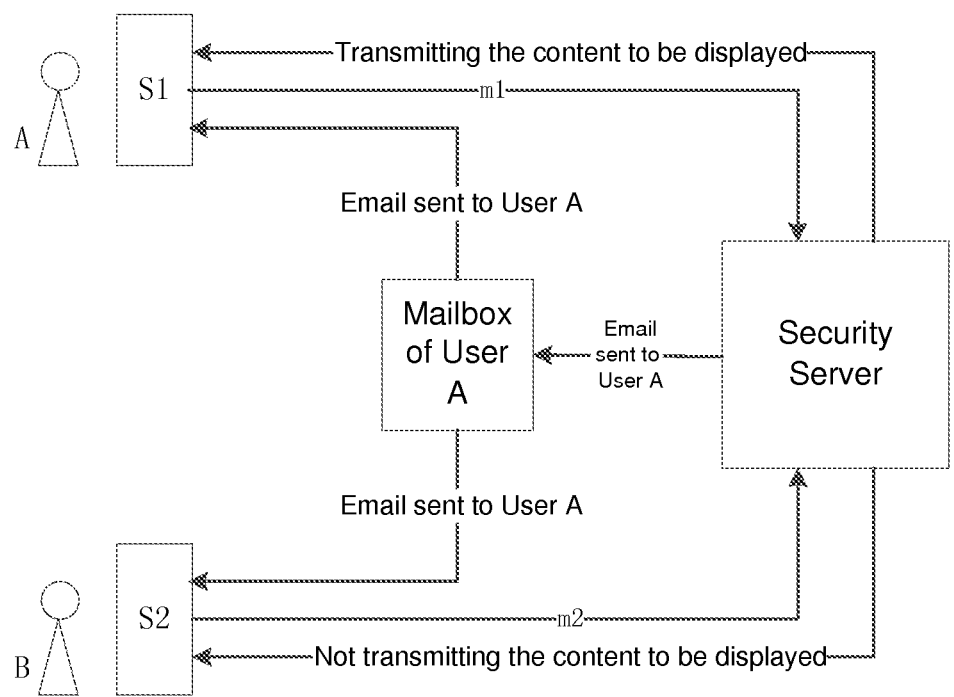
FIG. 5 is a transmitting flowchart of an email provided by the embodiment as illustrated in FIG. 4 of the present disclosure.

For example when an email is to be transmitted, using the information display method provided by the embodiment of the present disclosure to send an email can prevent the user from being cheated by the phishing email, and avoid the email content from being viewed by other persons (e.g., a thief) when a twin number (i.e., the user's account and password are leaked) appears. Please refer to FIG. 5 for an actual application, which illustrates a transmitting flowchart of an email provided by Embodiment 4 of the present disclosure. The transmitting flowchart of an email is as follows:

1. The user A downloads an official terminal S1 (plugin or APP), and inputs user identification information a used to bound with an identification s1 of the terminal S1 when the terminal S1 is used for the first time; the terminal S1 locally stores the mapping relationship between the user identification information a and the identification s1 of the terminal S1 as binding information m1, and transmits the binding information m1 to the security server for a storage.

2. The security server generates an email sent to the user A, and sends the email to a mailbox of the user A; the email includes a 2D code containing a security code character string and an information identification; in addition, the content to be displayed corresponding to the email is stored in the security server and not transmitted temporarily; meanwhile, the security server further establishes the mapping relationship between the information identification and the binding information m1 stored by the security server.

Figure 6:
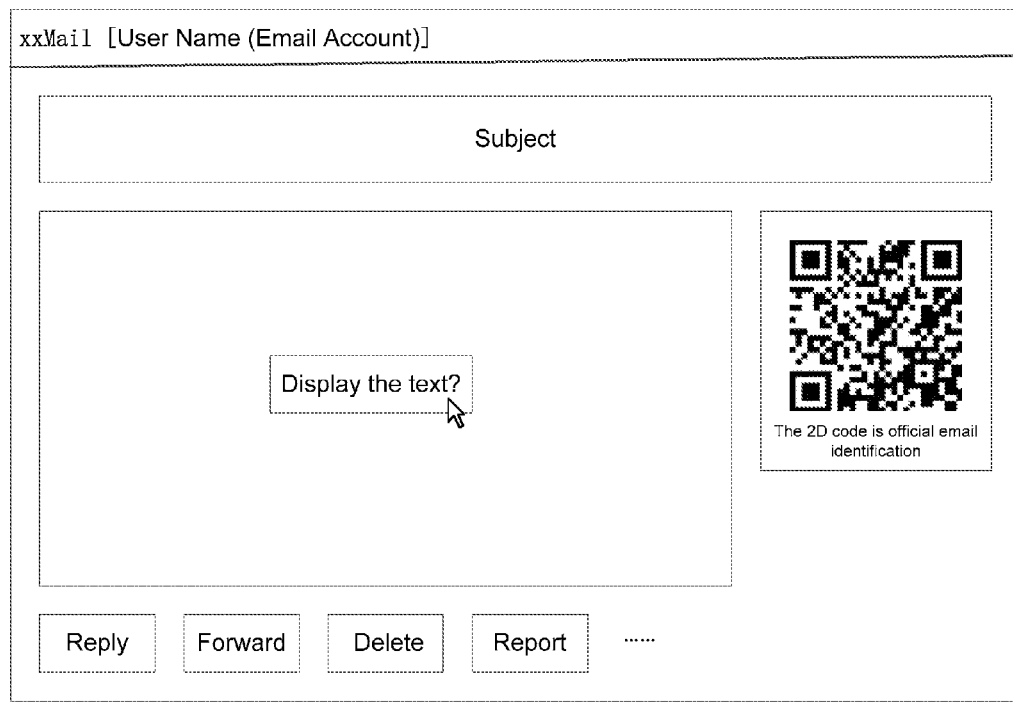
FIG. 6 is a schematic diagram of a first display state of an email provided by the embodiment as illustrated in FIG. 4 of the present disclosure.

3. The user A logs in his mailbox through the mailbox account and password, and receives the email at the terminal S1; the terminal S1 verifies whether the email is transmitted by the security server by scanning the security code character string in the email 2D code (i.e., detecting whether the email is a phishing email sent by lawbreakers); if the email is verified as being transmitted by the security server, the information identification in the email 2D code and the binding information m1 locally stored by the terminal S1 is transmitted to the security server. For example, referring to the schematic diagram of a first display state of an email as illustrated in FIG. 6, when the email is verified as being transmitted by the security server, the button "display the text" at the middle of the interface becomes clickable; in that case, if it is detected that the user clicks the button with the mouse, the terminal S1 carries the information identification in the email 2D code and the binding information m1 locally stored by the terminal S1 in a request for acquiring the content to be displayed, and transmits the request for acquiring the content to be displayed to the security server.

Figure 7:
FIG. 7 is a schematic diagram of a second display state of an email provided by the embodiment as illustrated in FIG. 4 of the present disclosure.

4. The security server inquires the binding information m1 stored by the security server according to the information identification transmitted by the terminal S1, compares the received binding information m1 with the locally inquired binding information m1, and transmits the content to be displayed corresponding to the email to the terminal S1 when the two compared information is consistent with each other. The terminal S1 receives the content to be displayed and displays it to the user A. For example, referring to the schematic diagram of a second display state of an email as illustrated in FIG. 7, the terminal S1 receives the content to be displayed and displays it at the middle portion of the interface.

5. If the mailbox account and password of the user A are leaked to a user B, the user B logs in the mailbox of the user A according to the mailbox account and password, and receives the email at a terminal S2 used by the user B; the terminal S2 transmits the information identification in the email 2D code and binding information m2 locally stored by the terminal S2 (i.e., a bonding relationship between an identification s2 of the terminal S2 and user identification information b inputted by the user B) to the security server; the security server inquires the binding information m1 stored by the security server according to the information identification transmitted by the terminal S2, compares the received binding information m2 with the locally inquired binding information m1, and does not transmit the content to be displayed of the email to the terminal S2 if detecting that the two compared information is inconsistent with each other, thus the user B cannot view the content to be displayed corresponding to the email.

To sum up, in the information display method provided by the embodiment of the present disclosure, the security server generates the information according to the 2D code added with the anti-fake information, and transmits the information to the terminal, so that the terminal detects whether the information is transmitted by the security server according to the anti-fake information, thereby solving the problem in the related art that it is difficult for the user to accurately recognize whether the information is secure, and achieving the purpose of automatically recognizing whether the received information is secure by the terminal according to the information containing the 2D code, and improving the information security.

Meanwhile, the information display method provided by the embodiment of the present disclosure further receives the information identification returned by the terminal and the binding information stored by the terminal, inquires the binding information stored by the security server according to the information identification, compares the received binding information with the inquired binding information, and transmits the content to be displayed of the information to the terminal when the two compared information is consistent with each other, thereby solving the problem in the related art that the content to be displayed of the information cannot be prevented from being viewed by other persons when a twin number appears, and achieving the purpose of improving the information security.

Figure 8:
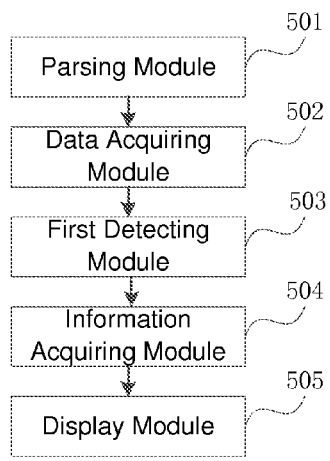
FIG. 8 is a structure schematic diagram of a terminal provided by an embodiment of the present disclosure.

In correspondence to the information display method provided by the embodiment as illustrated by FIG. 2 of the present disclosure, please refer to FIG. 8, in which a device structure schematic diagram of a terminal provided by an embodiment of the present disclosure is illustrated. The terminal comprises:

a parsing module 501 configured to parse received information which includes corresponding 2D code carrying content data, the content data containing anti-fake information;

a data acquiring module 502 configured to acquire the content data carried in the 2D code parsed by the parsing module 501;

a first detecting module 503 configured to detect whether the information is transmitted by a security server according to the anti-fake information contained in the content data acquired by the data acquiring module 502;

an information acquiring module 504 configured to acquire a content to be displayed corresponding to the information from the security server if the first detecting module 503 detects that the information is transmitted by the security server; and a display module 505 configured to display the content to be displayed acquired by the information acquiring module 504.

Figure 9:
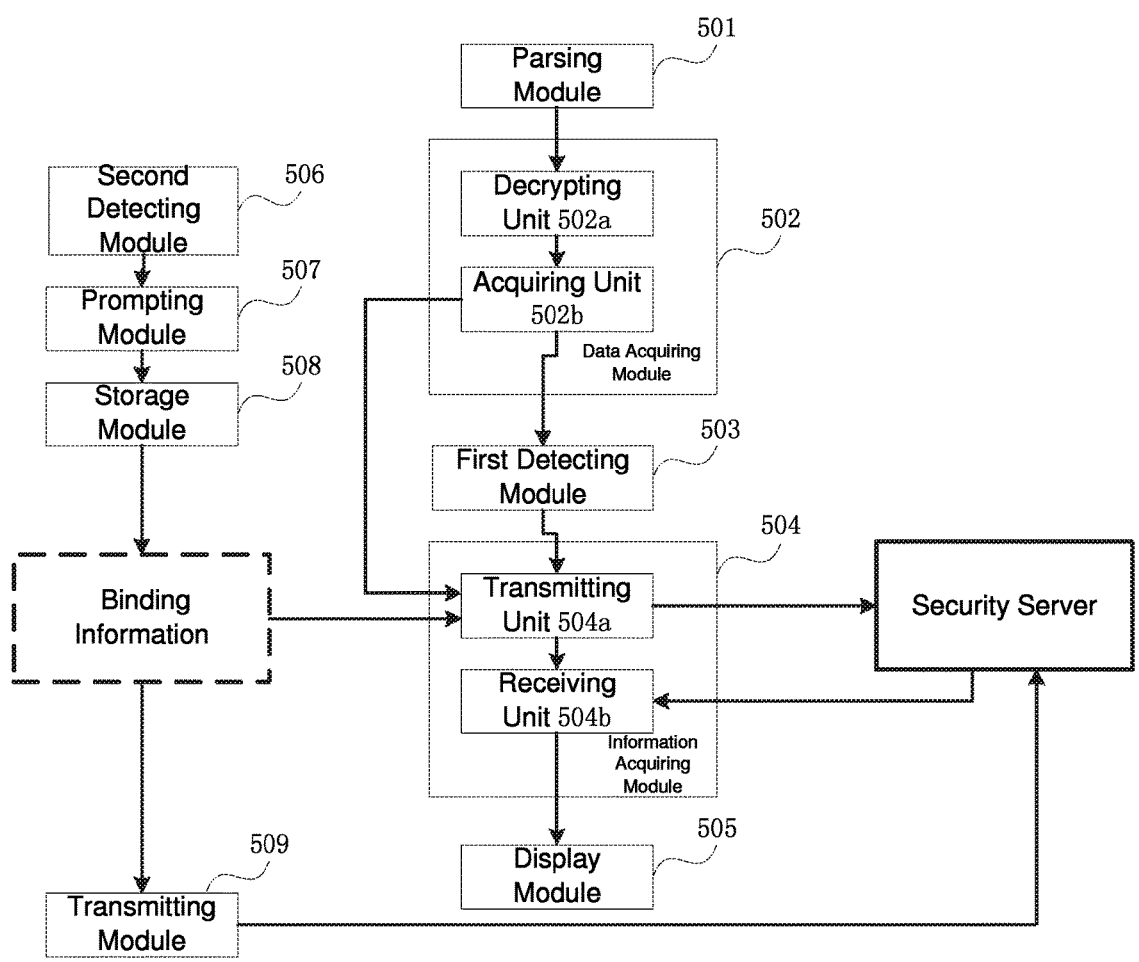
FIG. 9 is another structure schematic diagram of a terminal provided by another embodiment of the present disclosure.

Please refer to FIG. 9, which illustrates another device structure schematic diagram of a terminal provided by the embodiment of the present disclosure, wherein the content data parsed by the parsing module 501 is encrypted content data.

The data acquiring module 502 includes:

a decrypting unit 502a configured to decrypt the encrypted content data parsed by the parsing module 501; and an acquiring unit 502b configured to acquire the content data decrypted by the decrypting unit 502a.

In addition, the content data further contains the information identification of the information.

The information acquiring module 504 includes:

a transmitting unit 504a configured to transmit the information identification and the locally stored binding information to the security server, so that the security server detects whether the content to be displayed of the information shall be transmitted to the terminal according to the information identification and the binding information; and a receiving unit 504b configured to receive the content to be displayed of the information transmitted by the security server.

The display module 505 is configured to perform a step of displaying the content to be displayed if the receiving unit 504b receives the content to be displayed transmitted by the security server, wherein the information identification is a unique number of the information and/or a serial number of the 2D code.

The terminal further includes:

a second detecting module 506 configured to detect whether the terminal is run for the first time before the parsing module 501 parses the received information;

a prompting module 507 configured to prompt the user to input user identification information bound with an identification of the terminal when the second detecting module 506 detects that the terminal is run for the first time;

a storage module 508 configured to locally store a mapping relationship between the user identification information inputted by the user and the identification of the terminal as binding information; and a transmitting module 509 configured to transmit the binding information stored by the storage module 508 to the security server;

Wherein, the user identification information includes one or more of a user name, a user account, an email address and a user serial number.

To sum up, the terminal provided by the embodiment of the present disclosure acquires the anti-fake information carried in the 2D code by parsing the received information which includes the 2D code, and detects whether the information is transmitted by the security server according to the anti-fake information, thereby solving the problem in the related art that it is difficult for the user to accurately recognize whether the information is secure, and achieving the purpose of automatically recognizing whether the received information is secure and improving the information security. In addition, the terminal provided by the embodiment of the present disclosure transmits the information identification in the 2D code carried in the information and the binding information locally stored by the terminal to the security server, if the information is detected as being transmitted by the security server, so that the security server detects whether the content to be displayed of the information shall be transmitted to the terminal according to the information identification and the binding information; and displays the content to be displayed transmitted by the security server after receiving the same, thereby solving the problem in the related art that the content to be displayed of the information cannot be prevented from being viewed by other persons when a twin number appears, and achieving the purpose of improving the information security.

Figure 10:
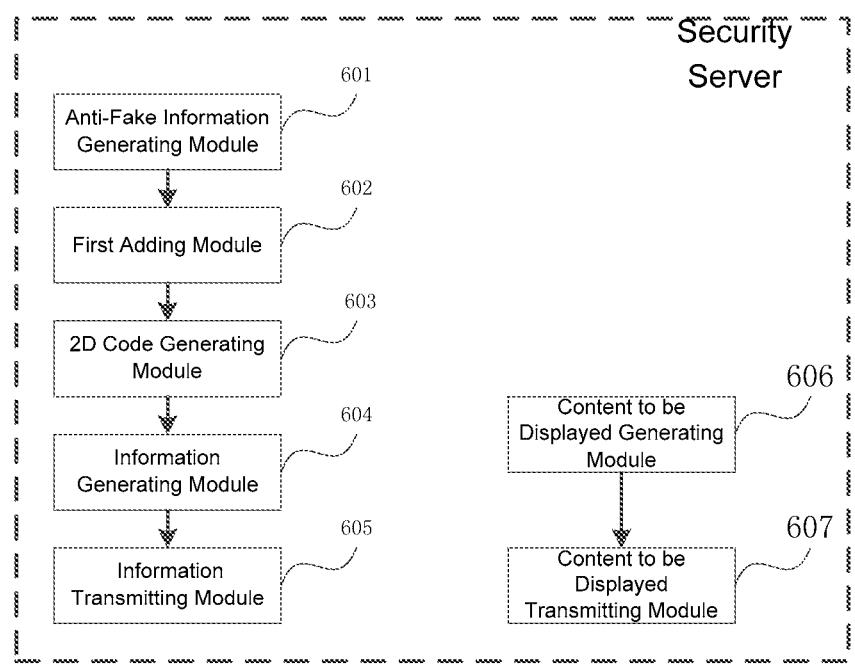
FIG. 10 is a structure schematic diagram of a security server provided by an embodiment of the present disclosure.

In correspondence to the information display method provided by the embodiment as illustrated in FIG. 4, please refer to FIG. 10, a device structure schematic diagram of a security server provided by another embodiment of the present disclosure is illustrated. The security server comprises:

an anti-fake information generating module 601 configured to generate anti-fake information;

a first adding module 602 configured to add the anti-fake information generated by the anti-fake information generating module into content data;

a 2D code generating module 603 configured to generate a 2D code according to the content data with the anti-fake information added by the first adding module 602;

an information generating module 604 configured to generate information according to the 2D code generated by the 2D code generating module 603;

an information transmitting module 605 configured to transmit the information generated by the information generating module 604 to a terminal, so that the terminal detects whether the information is transmitted by the security server according to the anti-fake information;

a content to be displayed generating module 606 configured to generate a content to be displayed; and a content to be displayed transmitting module 607 configured to transmit the content to be displayed generated by the content to be displayed generating module 606 to the terminal when the terminal detects that the information is transmitted by the security server according to the anti-fake information, so that the terminal displays the content to be displayed.

Figure 11:
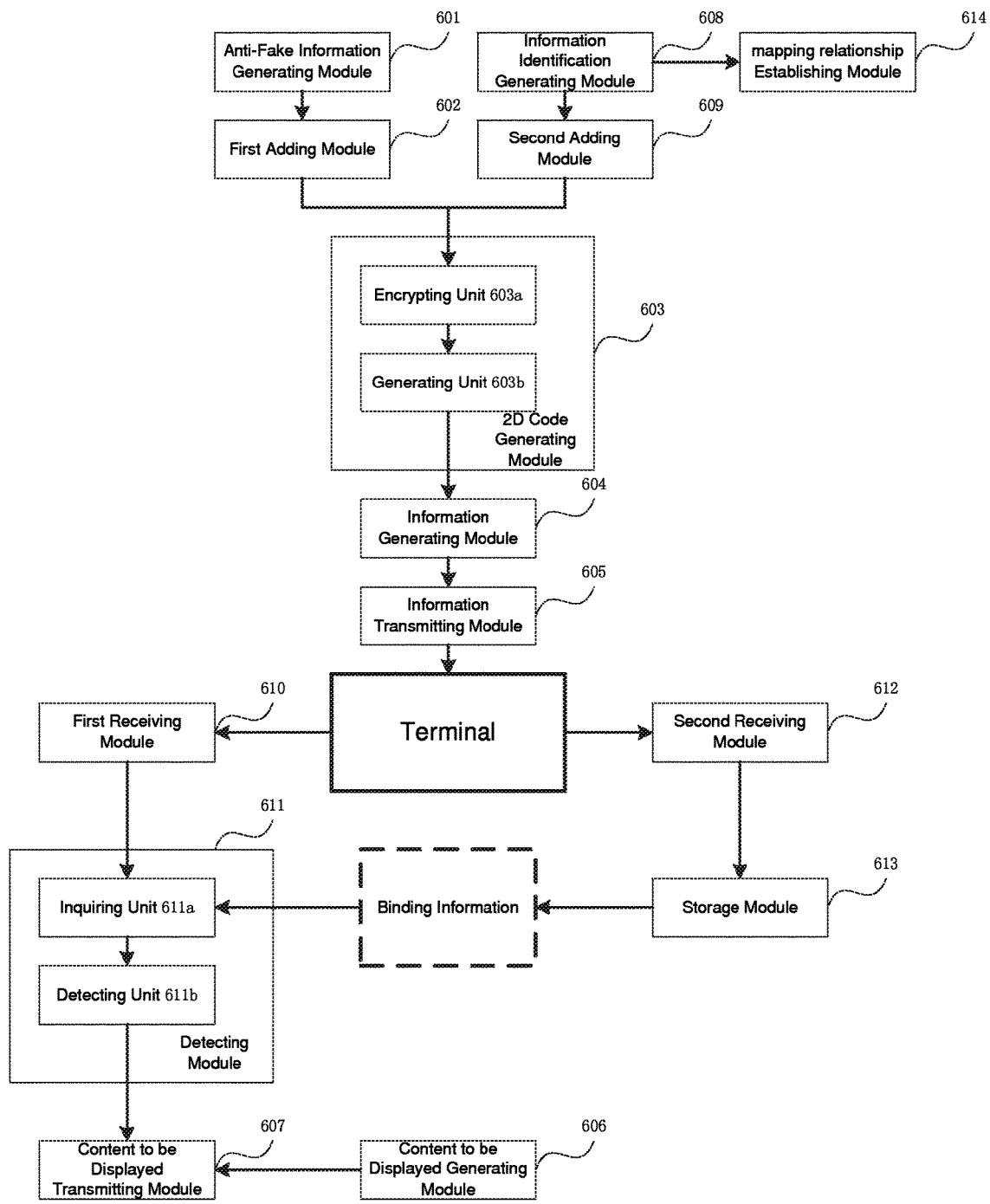
FIG. 11 is another structure schematic diagram of a security server provided by another embodiment of the present disclosure.

Please referring to FIG. 11, another device structure schematic diagram of a security server provided by another embodiment of the present disclosure is illustrated, wherein the 2D code generating module 603 includes:

an encrypting unit 603a configured to encrypt the content data with the anti-fake information added by the first adding module 602 in an encryption algorithm to acquire encrypted content data;

a generating unit 603b configured to generate the 2D code according to the content data encrypted by the encrypting unit 603a.

The security server further includes:

an information identification generating module 608 configured to generate information identification before the 2D code generating module 603 generates the 2D code according to the content data; and a second adding module 609 configured to add the information identification by the information identification generating module 608 into the content data.

The security server further includes:

a first receiving module 610 configured to receive the information identification returned by the terminal and the binding information stored by the terminal, after the information transmitting module 605 transmits the information to the terminal;

a detecting module 611 configured to detect whether the content to be displayed shall be transmitted to the terminal according to the information identification and the binding information received by the first receiving module 610; and the content to be displayed transmitting module 607 configured to perform a step of transmitting the content to be displayed to the terminal when the detecting module 611 detects that the content to be displayed shall be transmitted to the terminal, wherein the information identification is a unique number of the information and/or a serial number of the 2D code.

The security server further includes:

a second receiving module 612 configured to receive the binding information transmitted when the terminal is run for the first time before the anti-fake information generating module 601 generates the anti-fake information; and a storage module 613 configured to locally store the binding information transmitted when the terminal is run for the first time received by the second receiving module 612.

The security server further includes:

a mapping relationship establishing module 614 configured to establish the mapping relationship between the information identification and the locally stored binding information, after the information identification generating module 608 generates the information identification.

Specifically, the mapping relationship establishing module 614 is configured to inquire user identification information corresponding to the information identification, inquire the binding information transmitted by the terminal bound with the user identification information according to the user identification information, and establish the mapping relationship between the information identification and the inquired binding information.

The detecting module 611 includes:

an inquiring unit 611a configured to inquire the locally stored binding information according to the information identification received by the first receiving module 610 and the mapping relationship between the information identification and the locally stored binding information established by the mapping relationship establishing module 614;

a detecting unit 611b configured to detect whether the binding information received by the first receiving module 610 is consistent with the binding information inquired by the inquiring unit 611a; and the detecting unit 611b detects that the terminal is allowed to display the content to be displayed of the information, if the received binding information is consistent with the inquired binding information.

To sum up, the security server provided by embodiment of the present disclosure generates the information according to the 2D code added with the anti-fake information, and transmits the information to the terminal, so that the terminal detects whether the information is transmitted by the security server according to the anti-fake information, thereby solving the problem in the related art that it is difficult for the user to accurately recognize whether the information is secure, and achieving the purpose of automatically recognizing whether the received information is secure, and improving the information security. Meanwhile, the security server provided by the embodiment of the present disclosure further receives the information identification returned by the terminal and the binding information stored by the terminal, inquires the binding information stored by the security server according to the information identification, compares the received binding information with the inquired binding information, and transmits the content to be displayed of the information to the terminal when the two compared information is consistent with each other, thereby solving the problem in the related art that the content to be displayed of the information cannot be prevented from being viewed by other persons when a twin number appears, and achieving the purpose of improving the information security.

Figure 12:
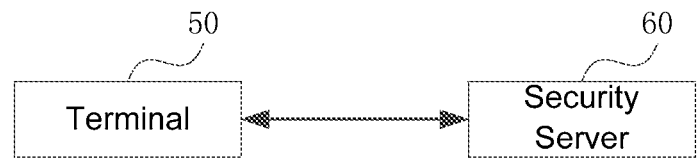
FIG. 12 is a system composition diagram of an information display system provided by another embodiment of the present disclosure.

Please refer to FIG. 12, which illustrates a system composition diagram of an information display system provided by an embodiment of the present disclosure. The information display system may include the terminal 50 provided by the embodiment as illustrated in FIG. 8 or 9 and the security server 60 provided by the embodiment as illustrated in FIG. 10 or 11.

To sum up, in the information display system provided by the embodiment of the present disclosure, the security server generates the information according to the 2D code added with the anti-fake information, and transmits the information to the terminal, so that the terminal detects whether the information is transmitted by the security server according to the anti-fake information, thereby solving the problem in the related art that it is difficult for the user to accurately recognize whether the information is secure, and achieving the purpose of automatically recognizing whether the received information is secure by the terminal according to the information containing the 2D code, and improving the information security.

Meanwhile, in the information display system provided by the embodiment of the present disclosure, the security server further receives the information identification returned by the terminal and the binding information stored by the terminal, inquires the binding information stored by the security server according to the information identification, compares the received binding information with the inquired binding information, and transmits the content to be displayed of the information to the terminal when the two compared information is consistent with each other, thereby solving the problem in the related art that the content to be displayed of the information cannot be prevented from being viewed by other persons when a twin number appears, and achieving the purpose of improving the information security.

To be noted, when the information display method provided by each embodiment displays the information to the user, the examples are only given based on the division of the above functional modules. In the practical applications, those functions may be allocated to be performed by different functional modules upon demand, i.e., the internal structure of the device may be divided into different functional modules to perform all or a part of the aforementioned functions. In addition, the terminal and the security server provided by the above embodiments belong to a same conception of the embodiments of the information display method, for their implementations please refer to the method embodiments, and herein are omitted.

Figure 13:
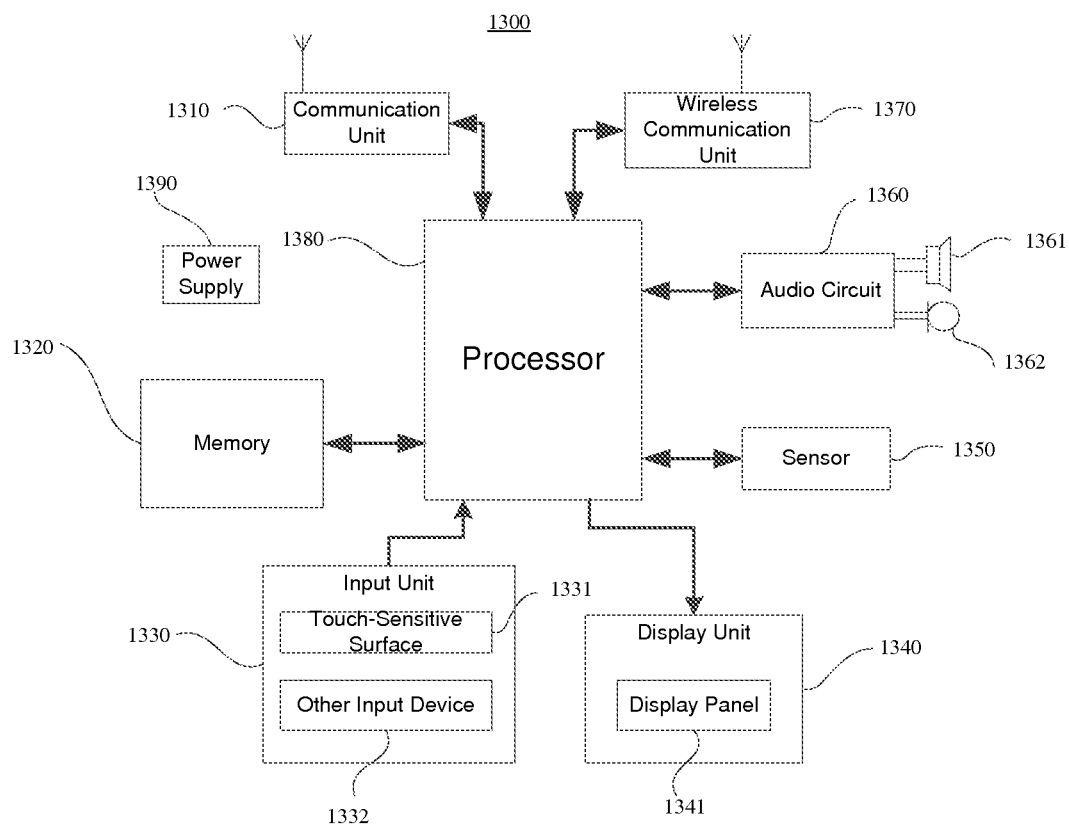
FIG. 13 is a structure schematic diagram of a terminal provided by an embodiment of the present disclosure.

Please refer to FIG. 13, which illustrates a structure schematic diagram of a terminal provided by an embodiment of the present disclosure. The terminal 1300 may include a communication unit 1310, a memory 1320 having one or more computer readable storage mediums, an input unit 1330, a display unit 1340, a sensor 1350, an audio circuit 1360, a Wireless Fidelity (WIFI) unit 1370, a processor 1380 having one or more processing cores, a power supply 1390, etc. A person skilled in the art shall appreciate that the terminal structure as illustrated in FIG. 13 is not a limitation to the terminal, and more or less parts may be included, or some parts may be combined, or the parts may be arranged differently.

The communication unit 1310 may be configured to receive and transmit signals in the process of information reception and transmission or conversation, and it may be a network communication device such as Radio Frequency (RF) circuit, router, modem, etc. Particularly, when the communication unit 1310 is an RF circuit, it receives downlink information of a base station, transfers the downlink information to one or more processors 1380 for a processing, and transmits uplink data to the base station. Usually, the RF circuit serving as the communication unit includes, but not limited to, an antenna, at least one amplifier, a tuner, one or more oscillators, a Subscriber Identity Module (SIM) card, a transceiver, a coupler, a Low Noise Amplifier (LNA) and a duplexer. In addition, the communication unit 1310 may communicate with the network and other devices through a wireless communication. The wireless communication may use any communication standard or protocol, including, but not limited to, Global System of Mobile communication (GSM), General Packet Radio Service (GPRS), Code Division Multiple Access (CDMA), Wideband Code Division Multiple Access (WCDMA), Long Term Evolution (LTE), email, Short Messaging Service (SMS), etc. The memory 1320 may be configured to store software programs and modules. The processor 1380 performs various function applications and data processing by running the software programs and modules stored in the memory 1320. The memory 1320 mainly includes a program storage area and a data storage area, wherein the program storage area may store an operating system, application programs required by at least one function (e.g., sound playing function and image playing function), etc., and the data storage area may store data created according to the usage of the terminal 1300 (e.g., audio data and telephone book), etc. In addition, the memory 1320 may include a high speed random access memory and a nonvolatile memory, such as at least one disk memory, flash memory or other volatile solid memory. Correspondingly, the memory 1320 may further include a memory controller to provide the processor 1380 and the input unit 1330 with an access to the memory 1320.

The input unit 1330 may be configured to receive inputted digital or character information, and generate a signal input of a keyboard, a mouse, an operating lever or an optical or track ball related to a user's setting or a function control. Preferably, the input unit 1330 may include a touch-sensitive surface 1331 and other input device 1332. The touch-sensitive surface 1331 is also referred to as touch display screen or touch pad, which collects the user's touch operation thereon or nearby (e.g., the user's operation on or near the touch-sensitive surface 1331 using any appropriate object or accessory such as finger and stylus), and drives corresponding connection device according to a preset program. Optionally, the touch-sensitive surface 1331 may include a touch detection device and a touch controller. The touch detection device detects the user's touch direction and a signal brought by the touch operation, and transmits the signal to the touch controller. The touch controller receives touch information from the touch detection device, converts the touch information into contact coordinates and transmits the contact coordinates to the processor 1380, then receives and performs a command from the processor 1380. In addition, the touch-sensitive surface 1331 may be implemented in multiple types such as resistance type, capacitance type, infrared ray and surface acoustic wave. In addition to the touch-sensitive surface 1331, the input unit 1330 may include other input device 1332. Preferably, other input device 1332 may include, but not limited to, one or more of a physical keyboard, a functional key (e.g., volume control key and on-off key), a trackball, a mouse and an operating lever etc.

The display unit 1340 may be configured to display information inputted to the user or information provided by the user, and various graphic user interfaces of the terminal 1300 which may be formed of images, texts, icons, videos or any combination thereof. The display unit 1340 may include a display panel 1341 optionally configured as a Liquid Crystal Display (LCD), an Organic Light-Emitting Diode (OLED), etc. Further, the touch-sensitive surface 1331 may cover the display panel 1341. When detecting a touch operation thereon or nearby, the touch-sensitive surface 1331 transmits it to the processor 1380 to determine the type of the touch event, and then the processor 1380 provides corresponding visual output on the display panel 1341 according to the type of the touch event. Although in FIG. 13, the touch-sensitive surface 1331 and the display panel 1341 realize the input and output function as two independent parts, in some embodiments the touch-sensitive surface 1331 and the display panel 1341 may be integrated to realize the input and output function.

The terminal 1300 may further include at least one sensor 1350, such as optical sensor, motion sensor and other sensor. The optical sensor may include ambient optical sensor and proximity sensor, wherein the ambient optical sensor may adjust the brightness of the display panel 1341 according to the brightness of the ambient light, and the proximity sensor may close the display panel 1341 and/or backlight when the terminal 1300 moves to the ear. As a motion sensor, the gravity acceleration sensor can detect the accelerations in various directions (generally in three axes), and detect the gravity size and direction when being still, so as to be used for applications recognizing phone attitudes (e.g., horizontal/vertical screen switching, related game, magnetometer attitude calibration, etc.) and related functions of vibration recognition (e.g., pedometer, knocking, etc.). The terminal 1300 may be further provided with other sensors such as gyroscope, barometer, hygrometer, thermometer and infrared sensor, which herein are omitted.

The audio circuit 1360, a loudspeaker 1361 and a microphone 1362 can provide an audio interface between the user and the terminal 1300. The audio circuit 1360 may transmit an electric signal converted from received audio data to the loudspeaker 1361, which converts the electric signal into a sound signal and outputs it. On the other hand, the microphone 1362 converts the collected sound signal into an electric signal, which is received by the audio circuit 1360 and converted into audio data. The audio data is outputted to the processor 1380 for a processing, and transmitted to for example another terminal through the communication unit 1310, or it is outputted to the memory 1320 for further processing. The audio circuit 1360 may further include an earplug jack to provide a communication between the external earphone and the terminal 1300.

In order to realize the wireless communication, the terminal may be provided with a wireless communication unit 1370 which may be a WIFI module. WIFI is a short distance wireless transmission technology, and the terminal 1300 can help the user to receive and transmit emails, browse webpage and access streaming media through the wireless communication unit 1370, thus the user is provided with a wireless broadband internet access. Although the wireless communication unit 1370 is illustrated in the drawing, it is not an essential component of the terminal 1300, and completely can be omitted upon demand without changing the essence of the present disclosure.

As the control center of the terminal 1300, the processor 1380 connects respective parts of the cell phone using different interfaces and lines, and performs various functions of the terminal 1300 and the data processing by running or executing the software programs and/or modules stored in the memory 1320 and calling the data stored in the memory 1320, thereby entirely monitoring the cell phone. Optionally, the processor 1380 may include one or more processing cores. Preferably, the processor 1380 may integrate an application processor mainly processing the operating system, the user interface and the application program, and a modem processor mainly processing the wireless communication. It shall be appreciated that the modem processor also may not be integrated in the processor 1380.

The terminal 1300 further includes a power supply 1390 (e.g., battery) which supplies power to the respective parts. Preferably, the power supply may be logically connected to the processor 1380 through a power management system to realize the functions of charging management, discharging management and power consumption management through a power management system. The power supply 1390 may further include one or more DC or AC power supplies, a recharging system, a power failure detection circuit, a power adapter or inverter, a power state indicator, etc.

Although not illustrated, the terminal 1300 may further include a camera, a Bluetooth module, etc., which are omitted herein.

In the embodiment, the terminal further includes one or more programs which are stored in the memory and configured to be executed by one or more processors. The one or more programs include instructions for performing the information display method provided by the embodiment of the present disclosure.

Figure 14:
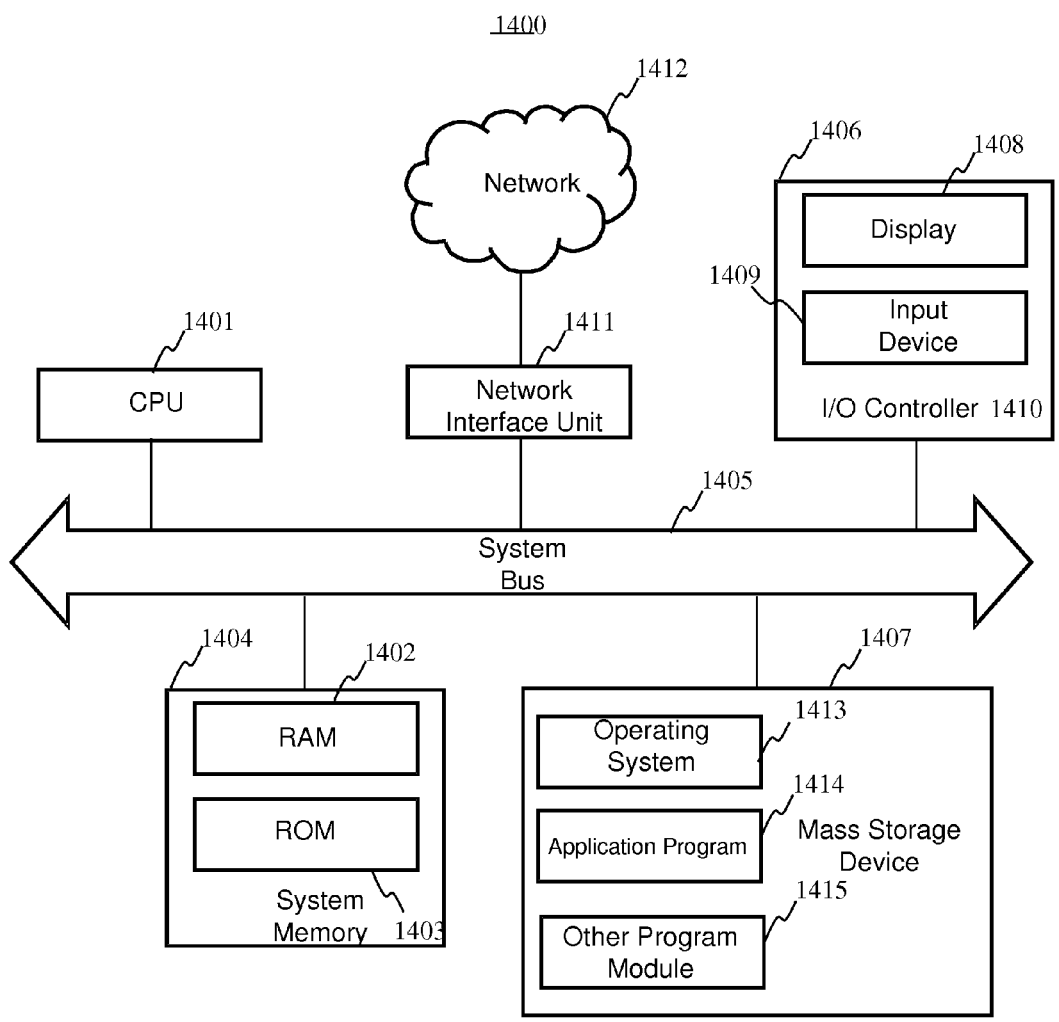
FIG. 14 is a structure schematic diagram of a security server provided by an embodiment of the present disclosure.

Please refer to FIG. 14, which illustrates a structure schematic diagram of a security server provided by an embodiment of the present disclosure. The security server 1400 includes a Central Processing Unit (CPU) 1401, a system memory 1404 having a Random Access Memory (RAM) 1402 and a Read Only Memory (ROM) 1403, and a system bus 1405 connecting the system memory 1404 with the CPU 1401. The security server 1400 further includes a basic input/output (I/O) system 1406 which helps the information transmission between respective parts in the computer, and a mass storage device 1407 which stores the operating system 1413, the application program 1414 and other program module 1415.

The basic I/O system 1406 includes a display 1408 which displays information, and an input device 1409 (e.g., mouse, keyboard, etc.) where the user inputs information. In which, both the display 1408 and the input device 1409 are both connected to the CPU 1401 through an I/O controller 1410 connected to the system bus 1405. The basic I/O system 1406 may further include the I/O controller 1410 configured to receive and process inputs from multiple other devices such as keyboard, mouse or electronic stylus etc. Similarly, the I/O controller 1410 further provides an output to the display screen, the printer or other type of output device.

The mass storage device 1407 is connected to the CPU 1401 through a mass storage controller (not illustrated) connected to the system bus 1405. The mass storage device 1407 and its associated computer readable medium provide a nonvolatile storage to the security server 1400. That is, the mass storage device 1407 may include the computer readable medium (not illustrated) such as hard disc or CD-ROM driver.

Without loss of generality, the computer readable medium may include a computer storage medium and a communication medium. The computer storage medium includes volatile and nonvolatile, movable and immovable mediums realized with any method or technology which stores the information such as computer readable instruction, data structure, program module or other data. The computer storage medium includes RAM, ROM, EPROM, EEPROM, flash or other solid memory, CD-ROM, DVD or other optical memory, tape cartridge and tape/disc storage device or other magnetic storage device. Of course, a person skilled in the art shall appreciate that the computer storage medium is not limited thereto. The system memory 1404 and the mass storage device 1407 may be collectively referred to as the memory.

According to the embodiments of the present disclosure, the security server 1400 may be connected to the remote computer in the network through a network such as the Internet. That is to say, the security server 1400 may be connected to a network 1412 through a network interface unit 1411 connected to the system bus 1405, or the network interface unit 1411 may be connected to other type of network or remote computer system (not illustrated).

The memory further includes one or more programs stored in the memory and containing instructions for performing the 2D code generation method and/or co-verification method.

Obviously, the terminal provided by the embodiment illustrated in FIG. 13 and the security server provided by the embodiment illustrated in FIG. 14 may construct an information display system.

The serial numbers of the embodiments of the present disclosure are just given for the convenience of description, rather than indicating the preferences thereof.

A person skilled in the art shall appreciate that all or a part of the steps of the above embodiments may be performed through hardware, or by instructing relevant hardware through a program, and the program may be stored in a computer readable storage medium. The storage medium mentioned above may be a Read-Only Memory (ROM), a magnetic disk, an optical disk, etc.

The above descriptions are just preferred embodiments of the present disclosure, rather than limiting the present disclosure. Any amendment, equivalent replacement, improvement, etc. made under the spirit and principle of the present disclosure shall fall within the protection scope of the present disclosure.

What is claimed is:

1. An information display method used in a terminal, comprising:
   parsing received information which includes corresponding two-dimensional (2D) code carrying content data, the content data containing anti-fake information;
   acquiring the content data carried in the 2D code, and detecting whether the information is transmitted by a security server according to the anti-fake information contained in the content data; and
   acquiring content to be displayed corresponding to the information from the security server and displaying the content to be displayed if the information is detected as being transmitted by the security server;
   wherein the content data further contains information identification of the information;
   acquiring content to be displayed corresponding to the information from the security server and displaying the content to be displayed comprises:
   transmitting the information identification and locally stored binding information to the security server, so that the security server detects whether the content to be displayed shall be transmitted to the terminal according to the information identification and the binding information; and
   receiving and displaying the content to be displayed transmitted by the security server, the content to be displayed being transmitted after the security server detects that the content to be displayed shall be transmitted to the terminal;
   wherein, the information identification is a unique number of the information and/or a serial number of the 2D code; the binding information is a mapping relationship between the user identification information and an identification of the terminal.

2. The method according to claim 1, wherein the content data is encrypted content data;
   acquiring the content data carried in the 2D code comprises:
   decrypting the encrypted content data to acquire decrypted content data.

3. The method according to claim 1, wherein before parsing the received information, the method further comprises:
   detecting whether the terminal is run for the first time;
   prompting a user to input user identification information bound with an identification of the terminal when the terminal is detected as being run for the first time;
   locally storing a mapping relationship between the user identification information inputted by the user and the identification of the terminal as binding information, and transmitting the stored binding information to the security server;
   wherein, the user identification information comprises one or more of a user name, a user account, an email address and a user serial number.

4. A terminal, comprising:
   one or more processors; and
   a memory;
   the memory stores one or more programs configured to be executed by the one or more processors and containing instructions for performing operations of:
   parsing received information which includes corresponding two-dimensional (2D) code carrying content data, the content data containing anti-fake information;
   acquiring the content data carried in the 2D code, and detecting whether the information is transmitted by a security server according to the anti-fake information contained in the content data; and
   acquiring content to be displayed corresponding to the information from the security server and displaying the content to be displayed if the information is detected as being transmitted by the security server;
   wherein the content data further contains information identification of the information;
   the one or more programs further contain instructions for performing operations of:
   transmitting the information identification and locally stored binding information to the security server, so that the security server detects whether the content to be displayed shall be transmitted to the terminal according to the information identification and the binding information; and
   receiving and displaying the content to be displayed transmitted by the security server, the content to be displayed being transmitted after the security server detects that the content to be displayed shall be transmitted to the terminal;
   wherein, the information identification is a unique number of the information and/or a serial number of the 2D code; the binding information is a mapping relationship between the user identification information and an identification of the terminal.

5. The terminal according to claim 4, wherein the content data is encrypted content data;
   the one or more programs further contain instructions for performing operations of:
   decrypting the encrypted content data to acquire decrypted content data.

6. The terminal according to claim 4, wherein the one or more programs further contain instructions for performing operations of:
   detecting whether the terminal is run for the first time;
   prompting a user to input user identification information bound with an identification of the terminal when the terminal is detected as being run for the first time;
   locally storing a mapping relationship between the user identification information inputted by the user and the identification of the terminal as binding information, and transmitting the stored binding information to the security server;
   wherein, the user identification information comprises one or more of a user name, a user account, an email address and a user serial number.

* * * * *